(12) United States Patent
Granucci et al.

(10) Patent No.: US 8,170,527 B2
(45) Date of Patent: May 1, 2012

(54) REAL-TIME BALANCE ON A MOBILE PHONE

(75) Inventors: Nicole Janine Granucci, San Francisco, CA (US); Carrie Elaine Vriheas, San Francisco, CA (US); Ayman A. Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 702 days.

(21) Appl. No.: 11/904,409

(22) Filed: Sep. 26, 2007

(65) Prior Publication Data

US 2009/0081990 A1   Mar. 26, 2009

(51) Int. Cl.
*H04M 11/00* (2006.01)

(52) U.S. Cl. ........ 455/406; 455/407; 455/408; 455/466; 705/37; 705/38; 705/30; 705/39; 705/40

(58) Field of Classification Search .......... 455/405–407, 455/410, 411; 705/30, 37, 40, 5, 7, 39
See application file for complete search history.

(56) References Cited

U.S. PATENT DOCUMENTS

| | | |
|---|---|---|
| 4,044,231 A | 8/1977 | Beck et al. |
| 4,613,904 A | 9/1986 | Lurie |
| 4,614,861 A | 9/1986 | Pavlov et al. |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,327,508 A | 7/1994 | Deaton et al. |
| 5,353,218 A | 10/1994 | DeLapa et al. |
| 5,359,183 A | 10/1994 | Skodlar |
| 5,388,165 A | 2/1995 | Deaton et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,530,438 A | 6/1996 | Bickham et al. |

(Continued)

FOREIGN PATENT DOCUMENTS

EP   1 096 439 A2   5/2001

(Continued)

OTHER PUBLICATIONS

"GSMVend Technical Manual"; http://www.bonusdata.net/IntusJunior/GSMVend/gsmvend.htm, 14 pages.

(Continued)

*Primary Examiner* — Jean Gelin
(74) *Attorney, Agent, or Firm* — Kilpatrick Townsend & Stockton

(57) ABSTRACT

A system, method and prepaid payment mobile phone configured to display a current prepaid balance. The prepaid payment mobile phone receives a debit balance request from input on the mobile phone. After retrieving an encoded current balance, the mobile phone displays the amount. The current balance may be calculated by the phone after a transaction, or the phone may receive a debit balance via a short message service notification.

21 Claims, 8 Drawing Sheets

U.S. PATENT DOCUMENTS

| | | |
|---|---|---|
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,959,577 A | 9/1999 | Fan et al. |
| 5,974,399 A | 10/1999 | Giuliani et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 | 11/2002 | Day et al. |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,560,581 B1 | 5/2003 | Fox et al. |
| 6,584,309 B1 | 6/2003 | Whigham |
| 6,587,835 B1 | 7/2003 | Treyz et al. |
| 6,601,759 B2 | 8/2003 | Fife et al. |
| 6,609,104 B1 | 8/2003 | Deaton et al. |
| 6,611,811 B1 | 8/2003 | Deaton et al. |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,747,547 B2 | 6/2004 | Benson |
| 6,775,539 B2 | 8/2004 | Deshpande |
| 6,832,721 B2 | 12/2004 | Fujii |
| 6,837,425 B2 | 1/2005 | Gauthier et al. |
| 6,868,391 B1 | 3/2005 | Hultgren |
| 6,877,665 B2 | 4/2005 | Challa et al. |
| 6,912,398 B1 | 6/2005 | Domnitz |
| 6,920,611 B1 | 7/2005 | Spaeth et al. |
| 6,975,852 B1 | 12/2005 | Sofer et al. |
| 6,990,330 B2 | 1/2006 | Veerepalli et al. |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,150,393 B1 | 12/2006 | Drummond et al. |
| 7,152,780 B2 | 12/2006 | Gauthier et al. |
| 7,159,770 B2 | 1/2007 | Onozu et al. |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,231,357 B1 | 6/2007 | Shanman |
| 7,231,372 B1 | 6/2007 | Prange et al. |
| RE39,736 E | 7/2007 | Morrill, Jr. |
| 7,243,853 B1 | 7/2007 | Levy et al. |
| 7,257,545 B1 | 8/2007 | Hung |
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,945,240 B1 * | 5/2011 | Klock et al. .................. 455/406 |
| 2001/0013542 A1 | 8/2001 | Horowitz et al. |
| 2002/0013711 A1 | 1/2002 | Ahuja et al. |
| 2002/0065713 A1 | 5/2002 | Awada et al. |
| 2002/0091569 A1 | 7/2002 | Kitaura et al. |
| 2002/0128903 A1 | 9/2002 | Kernahan |
| 2002/0161701 A1 | 10/2002 | Warmack |

| | | |
|---|---|---|
| 2002/0165775 A1 | 11/2002 | Tagseth et al. |
| 2002/0190118 A1 | 12/2002 | Davenport et al. |
| 2002/0198777 A1 | 12/2002 | Yuasa |
| 2003/0004808 A1 | 1/2003 | Elhaoussine |
| 2003/0058261 A1 | 3/2003 | Challa et al. |
| 2003/0120593 A1 | 6/2003 | Bansal et al. |
| 2003/0126078 A1 | 7/2003 | Vihinen |
| 2003/0144907 A1 | 7/2003 | Cohen et al. |
| 2003/0172040 A1 | 9/2003 | Kemper et al. |
| 2003/0212595 A1 | 11/2003 | Antonucci |
| 2003/0212642 A1 | 11/2003 | Weller et al. |
| 2003/0225618 A1 | 12/2003 | Hessburg et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0030601 A1 | 2/2004 | Pond et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0064406 A1 | 4/2004 | Yates et al. |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0186770 A1 | 9/2004 | Pettit et al. |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0254848 A1 | 12/2004 | Golan et al. |
| 2004/0260653 A1 | 12/2004 | Tsuei et al. |
| 2005/0021456 A1 | 1/2005 | Steele et al. |
| 2005/0029344 A1 | 2/2005 | Davis |
| 2005/0035847 A1 | 2/2005 | Bonalle et al. |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0075958 A1 | 4/2005 | Gonzalez |
| 2005/0097473 A1 | 5/2005 | Malik et al. |
| 2005/0102233 A1 | 5/2005 | Park et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0177510 A1 | 8/2005 | Hilt et al. |
| 2005/0199714 A1 | 9/2005 | Brandt et al. |
| 2005/0210387 A1 | 9/2005 | Alagappan et al. |
| 2005/0219061 A1 | 10/2005 | Lai et al. |
| 2005/0222933 A1 | 10/2005 | Wesby |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0053056 A1 | 3/2006 | Alspach-Goss et al. |
| 2006/0059110 A1 | 3/2006 | Madhok et al. |
| 2006/0080243 A1 | 4/2006 | Kemper et al. |
| 2006/0085260 A1 | 4/2006 | Yamagishi |
| 2006/0111967 A1 | 5/2006 | Forbes |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0247981 A1 | 11/2006 | Singh et al. |
| 2006/0248007 A1 | 11/2006 | Hofer et al. |
| 2006/0253390 A1 | 11/2006 | McCarthy et al. |
| 2006/0270421 A1 | 11/2006 | Phillips et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0194104 A1 | 8/2007 | Fukada |
| 2007/0203836 A1 | 8/2007 | Dodin |
| 2007/0205270 A1 | 9/2007 | Kemper et al. |
| 2007/0241189 A1 | 10/2007 | Slavin et al. |
| 2007/0244811 A1 * | 10/2007 | Tumminaro .................... 705/39 |
| 2007/0250380 A1 | 10/2007 | Mankoff |
| 2007/0276764 A1 | 11/2007 | Mann |
| 2007/0288373 A1 | 12/2007 | Wilkes |
| 2008/0003987 A1 | 1/2008 | Mechaley |
| 2008/0006685 A1 | 1/2008 | Rackley, III et al. |
| 2008/0021784 A1 | 1/2008 | Hessburg et al. |
| 2008/0040265 A1 * | 2/2008 | Rackley, III et al. ........... 705/40 |
| 2008/0114657 A1 | 5/2008 | Forzley |
| 2008/0120182 A1 | 5/2008 | Arnold et al. |
| 2008/0126145 A1 * | 5/2008 | Rackley, III et al. ............. 705/7 |
| 2008/0133366 A1 | 6/2008 | Evans et al. |
| 2008/0154727 A1 | 6/2008 | Carlson |
| 2008/0154735 A1 | 6/2008 | Carlson |
| 2008/0154772 A1 | 6/2008 | Carlson |
| 2008/0163257 A1 | 7/2008 | Carlson |
| 2008/0167991 A1 | 7/2008 | Carlson et al. |
| 2008/0183480 A1 | 7/2008 | Carlson |
| 2008/0201226 A1 | 8/2008 | Carlson |
| 2008/0208762 A1 * | 8/2008 | Arthur et al. .................... 705/79 |
| 2008/0300973 A1 | 12/2008 | DeWitt et al. |
| 2008/0319843 A1 | 12/2008 | Moser et al. |
| 2009/0076896 A1 | 3/2009 | DeWitt et al. |
| 2009/0076925 A1 | 3/2009 | DeWitt et al. |
| 2009/0078777 A1 | 3/2009 | Granucci et al. |
| 2009/0112721 A1 | 4/2009 | Hammad et al. |
| 2009/0119170 A1 | 5/2009 | Hammad et al. |
| 2009/0182634 A1 | 7/2009 | Park et al. |
| 2009/0314840 A1 | 12/2009 | Granucci et al. |
| 2010/0042540 A1 * | 2/2010 | Graves et al. ................... 705/40 |

FOREIGN PATENT DOCUMENTS

| | | |
|---|---|---|
| EP | 1 136 961 A1 | 9/2001 |
| GB | 2 348 781 B | 11/2003 |
| WO | WO 96/13814 A1 | 5/1996 |
| WO | WO 97/45814 A1 | 12/1997 |
| WO | WO 99/51038 A1 | 7/1999 |
| WO | WO 00/03328 A1 | 1/2000 |
| WO | WO 00/77697 A1 | 12/2000 |
| WO | WO 2004/077369 A1 | 9/2004 |
| WO | WO 2005/052869 A1 | 6/2005 |
| WO | WO 2006/024080 A1 | 3/2006 |

OTHER PUBLICATIONS

"M Pay: Frequently Asked Questions"; http://www.m-pay.com/index.php?id=18, 5 pages.

"Ubiquitous Commerce"; http://www.accenture.com/Global/Services/Accenture_Technology_Labs/R_and_I/Mobile..., 2 pages.

"Virtual Shopping: Straight Goods on Cyber-stores and Security." Chatelaine; vol. 70, p. 24 (Feb. 1997).

About Us, 1 page downloaded from http://www.cellfire.com/about-us/ on May 10, 2007, 1 page.

bCode™ is the future of Mobile Coupon, Ticketing, Loyalty and Payments, 2 page product brochure downloaded from http://www.bcode.com on May 11, 2007, 2 pages.

bCode™ MediaHub 200 Mobile Coupon, Ticketing Loyalty and Payments, 2 page product brochure, from http://www.bcode.com/news_media.htm on May 11, 2007, 2 pages.

Cellfire—Mobile coupons for your cell phone, 1 page product brochure downloaded from http://www.cellfire.com on May 11, 2007, 1 page.

Cellfire, Coupons on Cellfire, 2 pages downloaded from http://www.cellfire.com/coupons on May 10, 2007, 2 pages.

International Preliminary Report on Patentability from International Application No. PCT/US2007/088289 dated Jun. 30, 2009.

International Preliminary Report on Patentability from International Application No. PCT/US2007/088563 dated Jun. 30, 2009.

International Preliminary Report on Patentability from International Application No. PCT/US2007/088659 dated Jun. 30, 2009.

International Preliminary Report on Patentability from International Application No. PCT/US2007/088687 dated Jun. 30, 2009.

International Search Report from International Application No. PCT/US2007/088313 dated Jul. 30, 2008.

Emmerson, Kassidy; "The History of PayPal: One of the Most Successful Online Money Transmitters Today"; 2009, http://www.associatedcontent.com/pop_print.shtml?content_type=arti..., 1 page.

Kageyama, Yuri; "Japanese carrier unveils mobile-phone wallet"; http://usatoday.printthis.clickability.com/pt/cpt?action=cpt&title=USATODAY.com+-+Jap..., 3 pages.

Korousic, Bojan et al.; "3rd Year Project Report EZ-Ca$h: Feasibility Project"; 2003; *Electronics Engineering Technology—Telecommunications Systems, Conestoga College*, 33 pages.

Press Release, "Three months after California release, Cellfire™ reports redemption rates n times greater than paper coupons," issued by Cellfire, Inc. Mar. 22, 2006; pp. 1-2 downloaded from http://www.cellfire.com/about-us/articles/2006-03-22_redemption-rate, 2 pages.

Purdy et al., "When Mobile Coupons Replace Paper Coupons, Everyone Wins," pp. 1-17 published by Frost & Sullivan.[online]. info.cellfire.com, May 11, 2007, [Retrieved from the Internet: URL: http:// info.cellfire.com/cellfire/themes/cellfire/downloads/When_Mobile_Coupons_Replace_Paper_Coupons.pdf], 17 pages.

Subramanian, Hemang C.; "SIM Access Profile: Electronic currency using SIM Access Profile"; 2003, http:/www-128.ibm.com/developerworks/wireless/library/wi-simacc/, 6 pages.

* cited by examiner

REAL-TIME BALANCE ON A MOBILE PHONE

BACKGROUND

1. Field of the Invention

Aspects of the present invention relate in general to financial services. Aspects include a prepaid payment mobile phone apparatus, system, method and computer-readable medium configured to display a real-time prepaid payment balance. Further aspects of the invention include a method of storing and displaying a real-time prepaid payment balance on a mobile phone.

2. Description of the Related Art

The traditional paper "gift-certificate" is gradually being replaced by prepaid payment mobile phones—debit-account mobile phones with a set limited value associated with a Primary Account Number (PAN). Some mobile phone debit accounts are affiliated with a particular vendor, such as a department store, supermarket or restaurant; yet other mobile phone debit accounts are affiliated with an acquirer, payment processor, or other issuer.

When a mobile phone customer makes a purchase, the prepaid payment mobile phone may be used to pay for the transaction. If the purchase amount equals or exceeds the value of the prepaid payment mobile phone, the customer simply pays the excess amount using cash, credit card, debit card, or other financial instrument accepted by the vendor. However, when the purchase amount is less than the value of the prepaid payment mobile phone account, the purchase price is simply subtracted from the prepaid payment mobile phone account balance, and a new balance remains associated with the mobile phone.

Mobile phone customers who carry prepaid payment mobile phones are often unaware of the debit balance of a prepaid payment mobile phone, especially on non-reloadable mobile phone products. While some issuer and acquirers mandate support for balance inquiries for some gift mobile phones and incentive mobile phones, such support is optional at merchants.

When issuers fail to support these enhancements, or when merchants do not support them, mobile phone customers are restricted to spending the amount that is available on the mobile phone within one transaction often without knowing the balance in advance.

When issuers, acquirers, and processors do not support these enhancements at the point-of-sale, the consumer is inconvenienced, and the process breaks down. Consumer frustration is common, resulting in higher amounts of breakage (resulting in unrecognized sales volume), and alternate forms of payment being used. Worse, consumers are discouraged from purchasing more prepaid payment mobile phones.

In the re-loadable prepaid mobile phone category, the only way a consumer can determine their balance on a mobile phone is by calling their mobile phone issuer/third party agent or looking up the information online.

SUMMARY

Embodiments of the invention include a system, method and prepaid payment mobile phone configured to display a current debit balance. A remarkable aspect of the invention is that a prepaid balance retrieved from an issuer and stored at the prepaid payment mobile phone, as generally no such information is ever stored on such phones. The prepaid payment mobile phone receives a balance request from a button on the mobile phone. After retrieving the current balance encoded within, the mobile phone displays the current balance. The balance may be calculated after a payment transaction or received as a message from an acquirer, payment network, or issuer.

DETAILED DESCRIPTION

One aspect of the present invention includes the realization that displaying a real-time balance on a prepaid payment mobile phone reduces the cost of issuers supporting balance inquiry and balance returns from mobile phone customers. With the balance on a mobile phone display solution, mobile phone customers would be able to check their balance at any time, generating a higher volume of unplanned purchases, and potentially a higher amount of re-loads at the point of sale.

Embodiments of the present invention include a mobile phone apparatus, system, method, and computer-readable medium configured to support the real-time display of a debit balance on a prepaid payment mobile phone. Other embodiments of the present invention may include remote terminals configured to support the real-time display of a debit balance on a prepaid payment mobile phone.

Figure 1A:
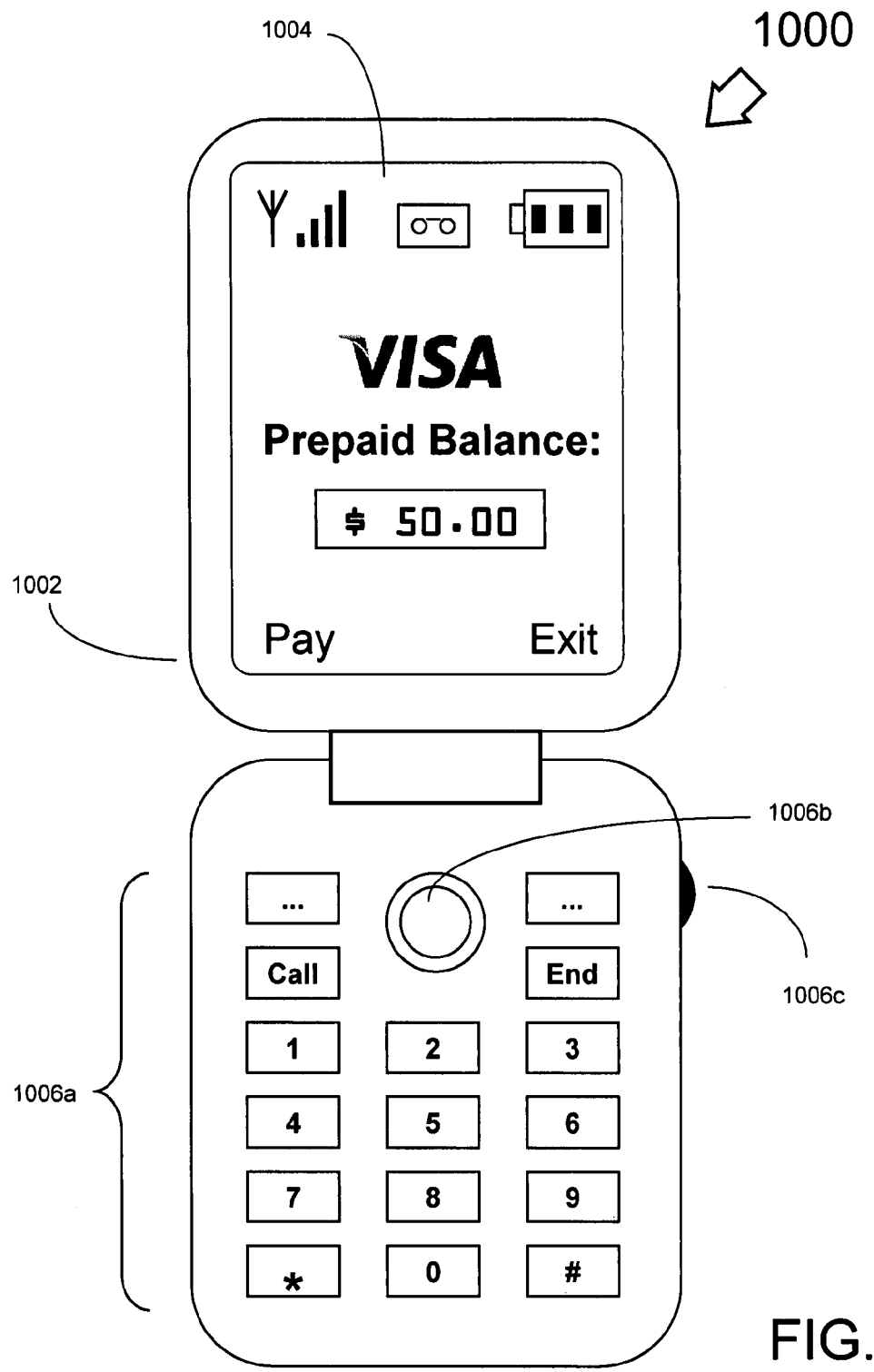
FIGS. 1A-B illustrate an embodiment of a prepaid payment mobile phone configured to display the current balance.
Figure 1B:
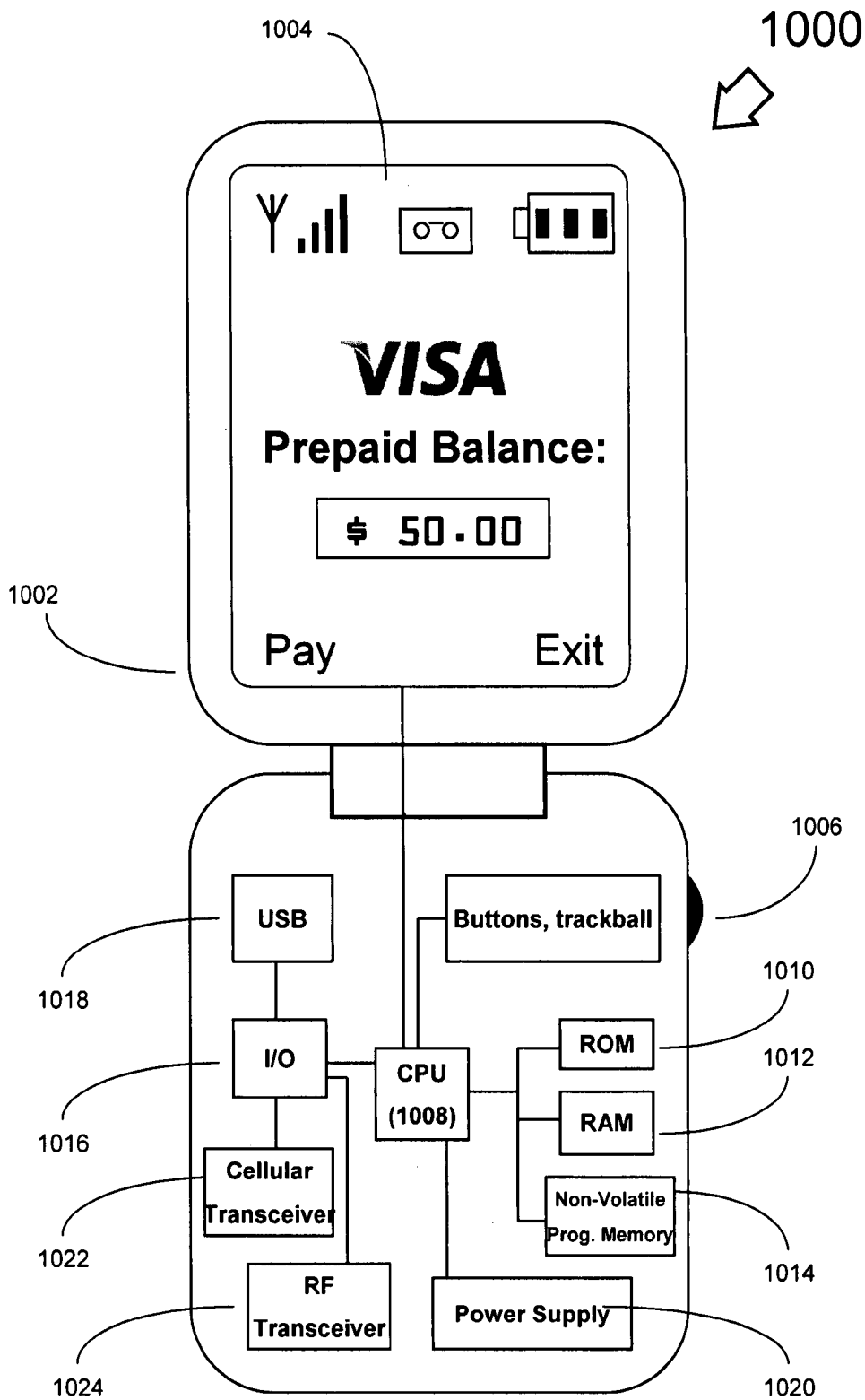

Turning to FIGS. 1A-B, these figures depict a prepayment mobile phone 1000 configured to display of a balance on a real-time balance, constructed and operative in accordance with an embodiment of the present invention. In this example, prepayment mobile phone 1000 is depicted as a two-piece "flip" phone, but it is understood that the principles herein may be applied to any style mobile phone capable of electronic payment.

As shown in FIG. 1A, the payment mobile phone 1000 includes a housing 1002, a display 1004, and an input 1006. It is understood that housing 1002 may comprise one or more components. Some embodiments of housing 1002 may be plastic or any other suitable material known in the art.

Display 1004 may be a liquid crystal display (LCD), light-emitting-diode (LED), organic light-emitting-diode (OLED), surface-conduction electron-emitter display (SED), digital light processing (DLP), interferometric modulator display (IMOD) or any other display known in the art that can be used within the form factor required by the payment mobile phone 1000.

Input 1006 may be any sensor or input device known in the art, including, but not limited to buttons 1006a, trackballs 1006*b*, scroll-wheels 1006*c*, touch-pads or the like. In some embodiments, input 1006 and display 1004 may be merged as a touch-screen input device.

Internal components of payment mobile phone 1000 are shown in FIG. 1B. Contained within housing 1002, a processor or central processing unit 1008 is electrically coupled to the display 1004, input 1006, Read-Only-Memory (ROM) 1010, Random Access Memory (RAM) 1012, a non-volatile programmable memory 1014, input/output circuitry 1016, an input/output port 1018, power supply 1020, cellular transceiver 1022, and radio-frequency transceiver 1024. It is understood by those familiar with the art that some or all of these elements may be embedded together in some combination as an integrated circuit (IC).

Processor 1008 may be any central processing unit, microprocessor, micro-controller, computational device or circuit known in the art.

Read only memory 1010 is embedded with an operating system.

Non-volatile programmable memory 1014 is configured to be an application memory device, and may store information such as the primary account number and/or current debit balance information. Examples of non-volatile programmable memory 1014 include, but are not limited to: a magnetic stripe, flash memory, Electrically Erasable Programmable Read-Only Memory (EEPROM), or any other non-volatile computer memory or storage known in the art.

Random access memory 1012 is any temporary memory storage medium element known in the art. Random access memory is usually (but does not have to be) volatile memory.

The processor 1008, the read only memory 1010, the random access memory 1012 and the non-volatile programmable memory 1014 may coupled to one another through an internal bus system. Data can be interchanged between the input/output unit 1016, the processor 1008 and the non-volatile programmable memory 1014. Furthermore, data can be interchanged between the processor 1008 and the non-volatile programmable memory 1014.

Additionally, in some embodiments, the input/output circuitry 1016 is further coupled to an input/output port 1018 being formed in a surface area of the plastic housing 1002. Input/output port 1018 may be any data communications port known in the art, including, but not limited to: a serial port, a parallel port, a Universal Serial Bus (USB) interface, an the Institute of Electrical and Electronics Engineers (IEEE) 1394 ("firewire") interface, or any port known in the art.

Cellular transceiver 1022 may be any cellular, personal communications system (PCS), Global System for Mobile Communications (GSM), General Packet Radio Service (GPRS), Enhanced Data for GSM Evolution (EDGE), Code Division Multiple Access (CDMA), Wideband Code Division Multiple Access (WCDMA), Frequency Division Multiple Access (FDMA), Orthogonal Frequency-Division Multiplexing (ODFM), or any other wireless communications protocol known in the art able to support voice communications.

Radio frequency transceiver 1024 may use any wireless data protocol known in the art, such as: Bluetooth, Wireless Application Protocol (WAP), IEEE 802.11 ("WiFi"), IEEE 802.16 ("WiMax"), or any other wireless data communications standard known in the art.

Power supply 1020 may be any electrical power supply, including a battery, fuel cell, long-term capacitor or any other power storage known in the art. Power supply 1020 may be recharged by applying a direct current voltage.

Figure 2:
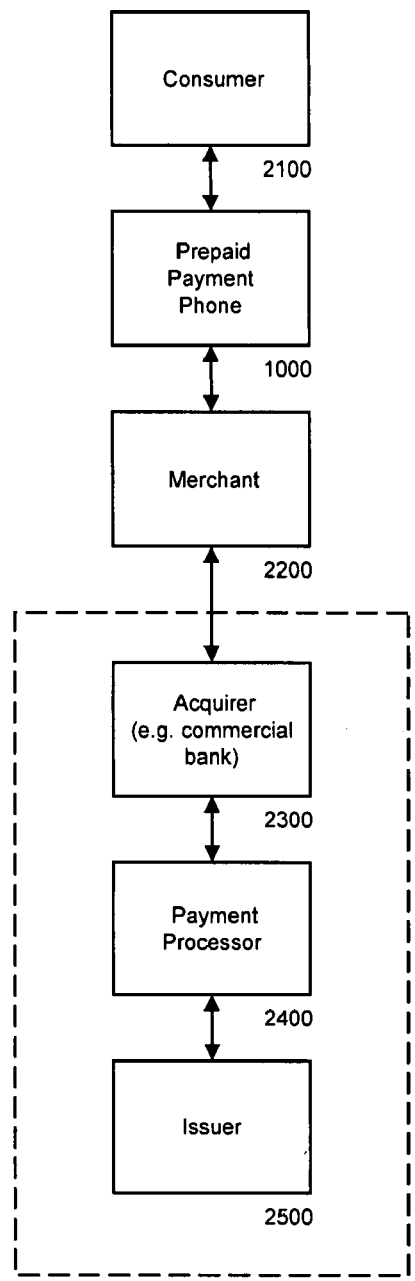
FIG. 2 is a block diagram of a system embodiment to support the display of a current debit balance on a prepaid payment mobile phone.

FIG. 2 illustrates a system to support the display of a real-time prepaid payment balance on a mobile phone, constructed and operative in accordance with an embodiment of the present invention. A customer 2100 receives a prepaid payment mobile phone 1000. In some instances the mobile phone 1000 is purchased from an issuer 2500; in other instances the customer receives the mobile phone 1000 indirectly from the issuer 2500, as a gift or as the result of a promotion. When the customer 2100 uses the prepaid payment mobile phone 1000 at a merchant 2200 to pay for a product or service, the merchant 2200 contacts an acquirer 2300 (for example, a commercial bank) to determine whether there is sufficient funds on the mobile phone to pay for the transaction or a portion of the transaction. The acquirer 2300 forwards the details of the payment transaction to a payment processor 2400 for processing. Payment processor may be any payment network known in the art. An example of a payment network includes, but is not limited to: Visa™, MasterCard™, American Express™, Club™, or Discover™. In some instances, the payment processor 2400 determines whether the transaction should be allowed; in other instances, the payment processor 2400 queries the 2500 to determine whether the prepayment mobile phone has enough funds to allow the transaction.

Figure 3:
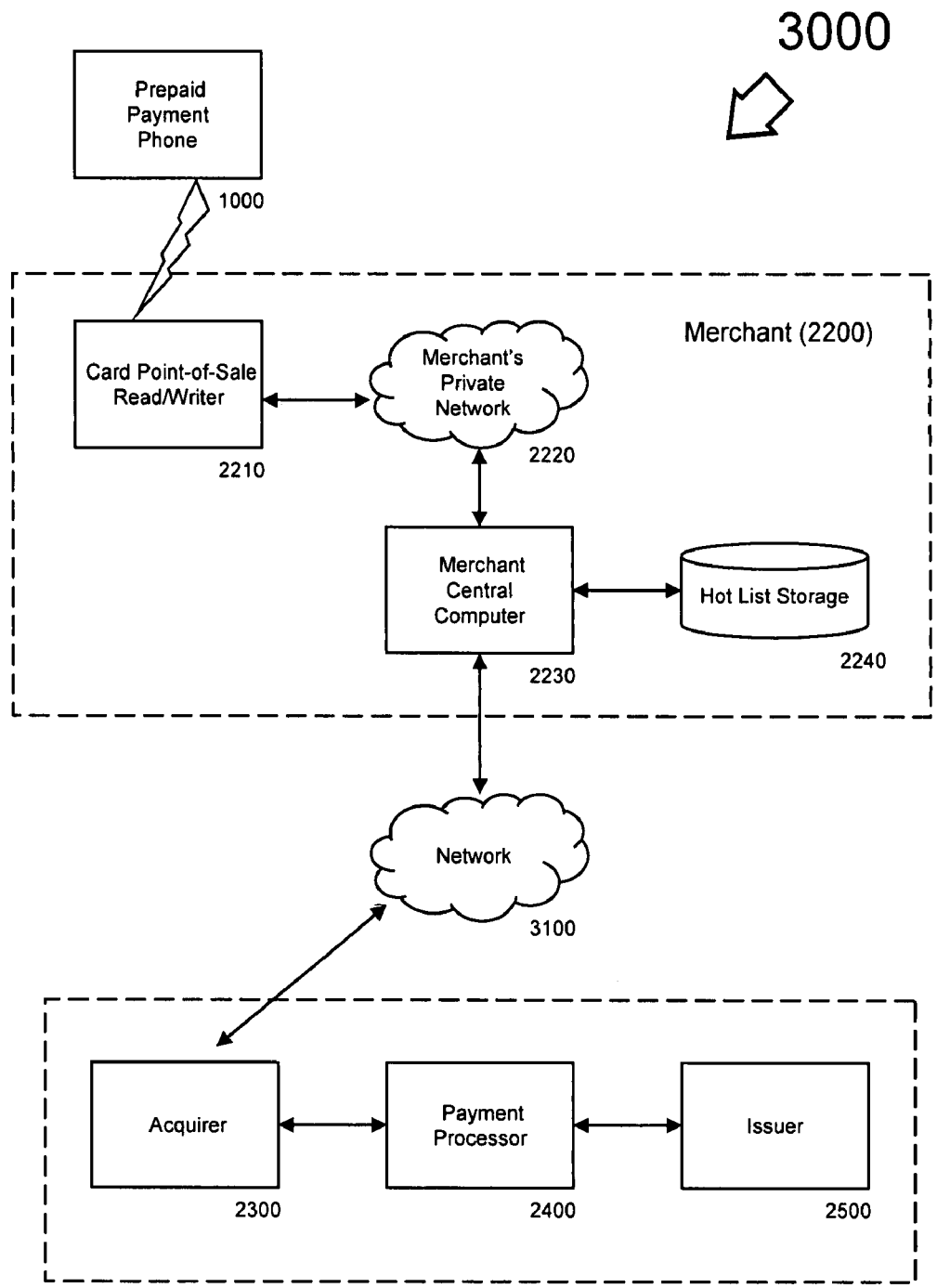
FIG. 3 is an expanded view of a merchant's system embodiment to support the display of the current debit balance on a prepaid payment mobile phone.

FIG. 3 depicts merchant 2200 in greater detail, where merchant 2200 includes a system to support the display of a real-time prepaid payment balance on a mobile phone, constructed and operative in accordance with an embodiment of the present invention. As shown, in FIG. 3, merchant 2200 comprises a mobile phone point-of-sale read/writer 2210 that communicated with a merchant central computer 2230 via the merchant's private network 2220. In some embodiments, merchant central computer 2230 may be coupled to hot list storage 2240.

Mobile phone point-of-sale read/writer 2210 is any device capable of reading a personal account number off a prepaid payment mobile phone 1000, and write balance information to the prepaid payment mobile phone 1000.

Merchant central computer 2230 is a networked device capable of communicating transaction data with mobile phone point-of-sale read/writer 2210 and transmitting the transaction data over network 3100 to acquirer 2300.

Hot list storage 2240 may be any list, database, or memory structure containing either invalid or valid primary account numbers.

Operation of these prepayment mobile phone and system embodiments of the present invention may be illustrated by example.

We now turn our attention to method or process embodiments. It is understood by those known in the art that instructions for such method embodiments may be stored on a non-volatile programmable memory 1014 and executed by a processor 1008.

Figure 7:
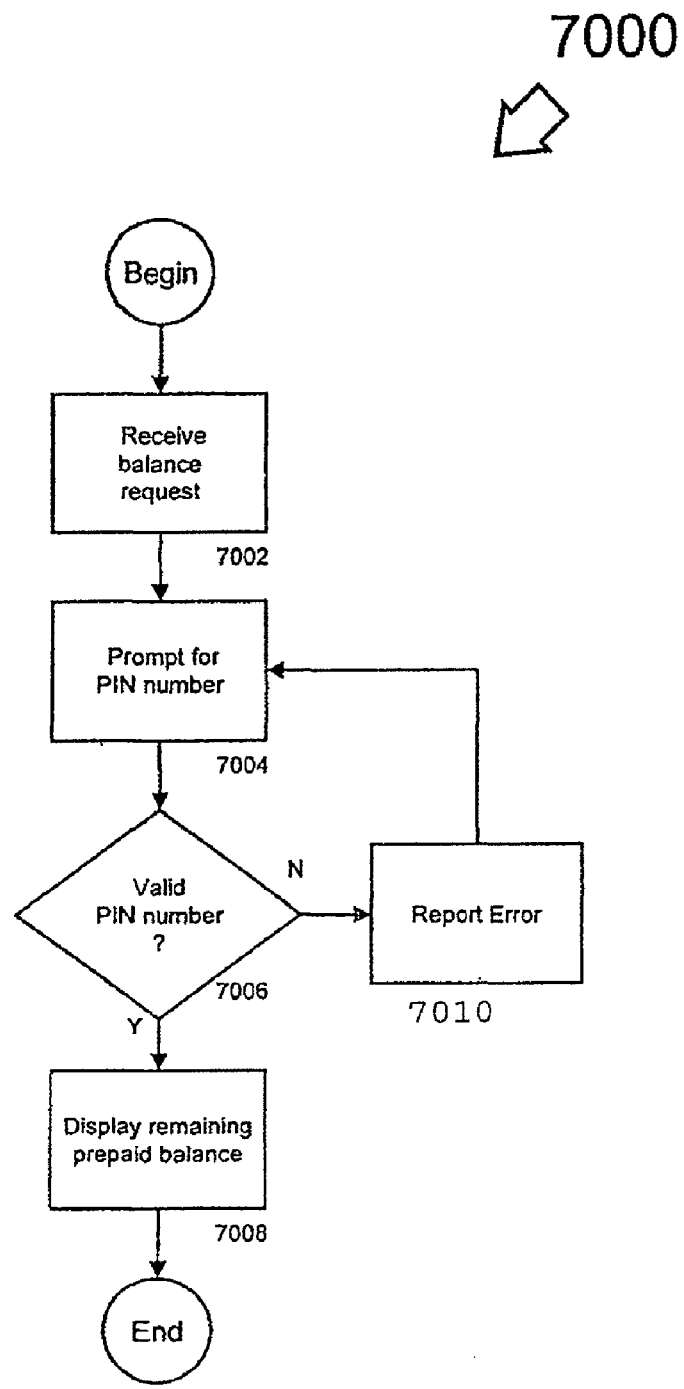
FIG. 7 illustrates a process embodiment to display the current debit balance of a prepaid payment mobile phone.

FIG. 7 illustrates a process embodiment to display the current debit balance of a prepaid payment mobile phone 1000, constructed and operative in accordance with an embodiment of the present invention. When a user wants to know the balance of prepaid payment mobile phone 1000, the user requests the balance through pressing button 1006. The mobile phone receives the balance request, block 7002.

In mobile phone 1000 embodiments that utilize a personal identification number (PIN), display 1004 prompts the user for the PIN number, block 7004. The personal identification number may be stored in non-volatile programmable memory 1014. At this point, the user may enter a PIN number using buttons 1006*a*.

In some embodiments, an error message is displayed when an invalid PIN number is entered, block 7010, and flow returns to block 7004.

Upon receipt of a valid PIN number as determined at decision block 7006, the display shows the remaining prepaid balance, block 7008.

Figure 4:
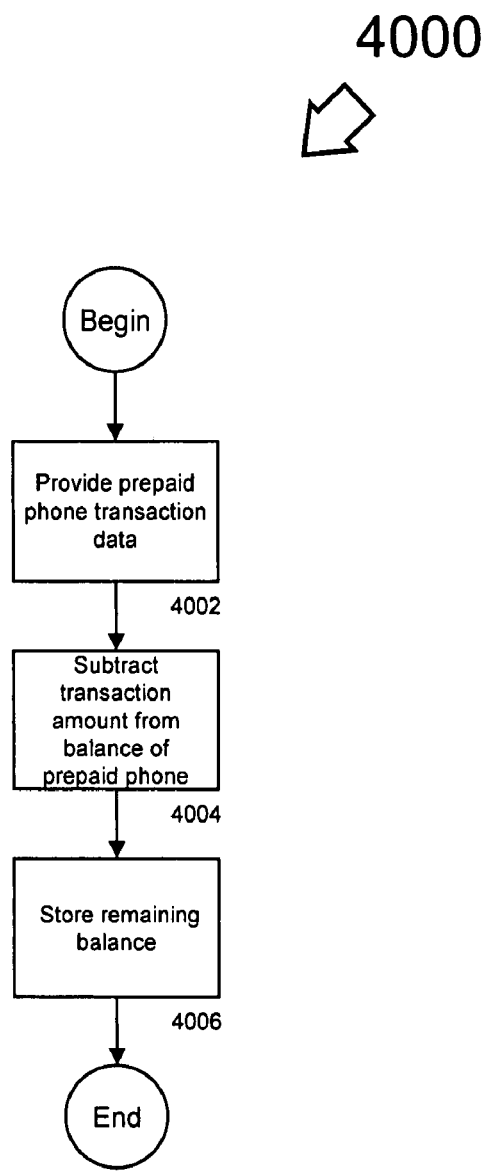
FIG. 4 is a flow chart of a mobile phone process embodiment configured to calculate and store balance information after a payment transaction.

Turning to FIG. 4, a flow chart depicts a mobile phone-writer process embodiment configured to calculate and store balance information on a prepaid payment mobile phone after a payment transaction, constructed and operative in accordance with an embodiment of the present invention.

When a prepaid payment mobile phone 1000 is presented for payment at a merchant 2200, the primary account number and other data may be read at a mobile phone point-of-sale read/writer 2210, block 4002. The mobile phone 1000 may be presented in a variety of different methods, such as transmitting personal account data or via a contactless ("paywave") radio-frequency presentation, as are known in the art.

The transaction amount is subtracted from the pre-paid balance on the phone, block 4004, and the new remaining balance is stored at block 4006.

Figure 5:
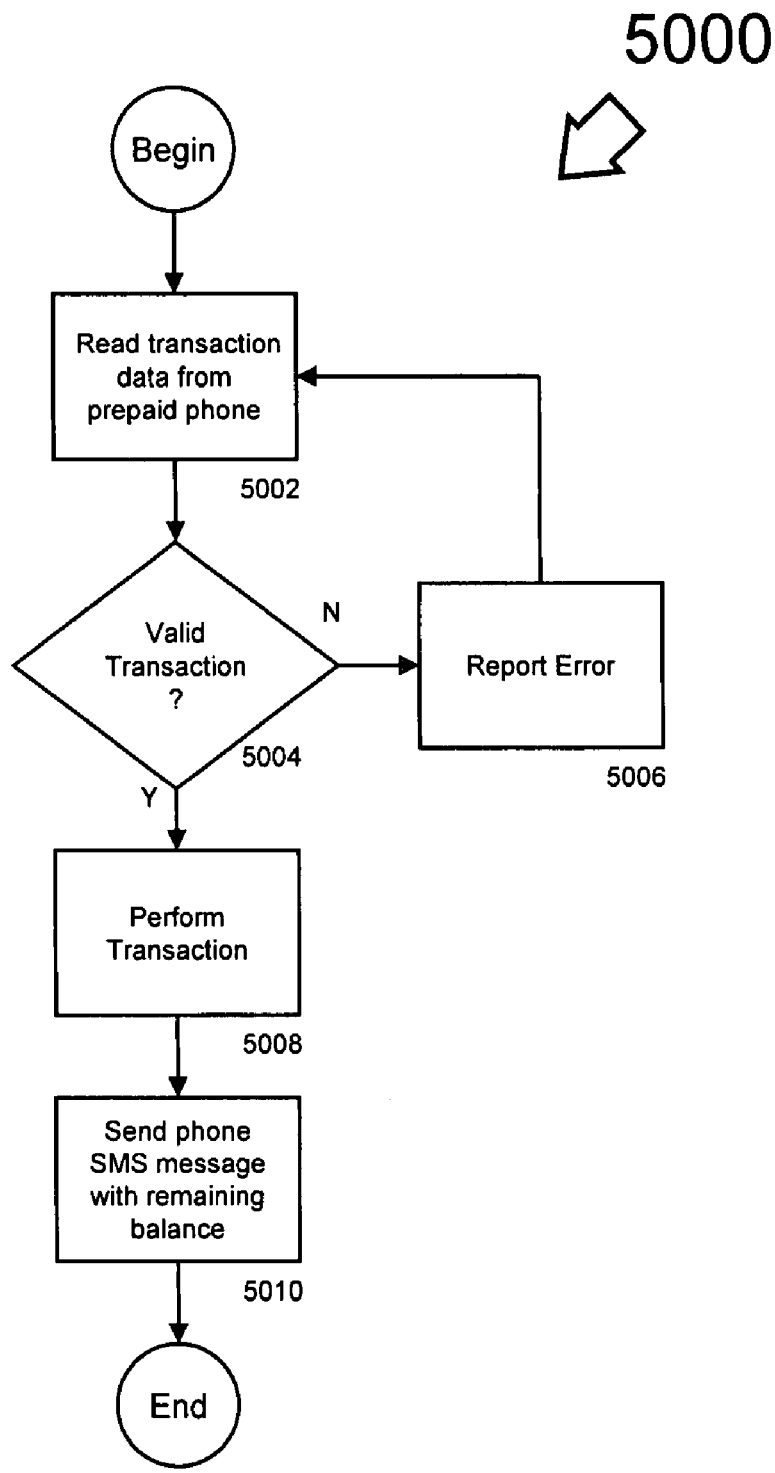
FIG. 5 illustrates a process embodiment sends a prepaid payment mobile phone balance information after a payment transaction.

FIG. 5 illustrates a process embodiment in which the acquirer 2300, payment processor 2400 or issuer 2500 sends the prepaid payment phone 1000 a Short Message Service (SMS) notification containing updated balance information, constructed and operative in accordance with an embodiment of the present invention. In some embodiments the balance information is subsequently stored on the prepaid payment mobile phone. As part of the payment transaction, primary account number and other information is read by merchant 2200, block 5002. Prepaid payment mobile phone 1000 is received from a mobile phone point-of-sale read/writer 2210, via the RF transceiver 1024, block 5002.

A payment card validation, as is known in the art, is performed using the data retrieved from the prepaid payment phone 1000. In some embodiments, merchant central computer 2230 consults with hot list storage 2240 to determine whether the transaction may be validated. In other embodiments, merchant central computer 2230 contacts acquirer 2300 to determine whether the transaction is valid. If the transaction is invalid as determined at decision block 5004, an error message is returned at block 5006. When the transaction is valid, flow continues at block 5008.

At block 5008, the payment transaction occurs.

Either after the payment transaction is completed, or during the transaction, acquirer 2300, payment processor 2400 or issuer 2500 sends the prepaid payment, phone 1000 an SMS notification containing updated balance information, block 5010. The SMS notification may be saved to the phone as either an SMS notification, or as data for the phone's payment program.

Figure 6:
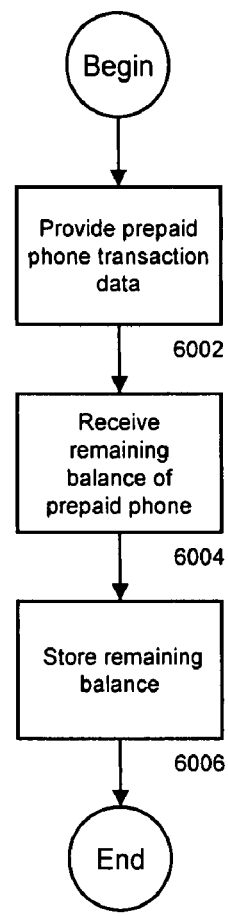
FIG. 6 is a flow chart of a mobile phone-writer process embodiment that stores balance information.

FIG. 6 depicts a flow chart of a mobile phone-writer process 6000 embodiment that stores new balance information on a prepaid payment mobile phone 1000 after a transaction or fund reload, constructed and operative in accordance with an embodiment of the present invention. FIG. 6 assumes that the mobile phone reload is occurring at merchant 2200 in communication with issuer 2500; it is understood that the reload mobile phone may also occur at other locations. It is also understood that process 6000 may also be used during the activation of pre-payment mobile phones 1000 when such mobile phones are initially purchased.

At first, prepaid payment mobile phone 1000 provides its transaction data to a mobile phone point-of-sale read/writer 2210, block 6002. Such transaction data may include the primary account number or other identifier. The new balance of the prepaid mobile phone is sent to the mobile phone 1000, block 6004. The amount of the new balance may be received as data from payment processor 2400, issuer 3400 or calculated by the merchant 2200 using information received from issuer 2500 or payment processor 2400. In mobile phone embodiments that use RF ID, the receipt of the new balance may be accomplished via the RF transceiver 1024. In other embodiments, the new balance may be received as a SMS notification, or any other data transmission known in the art. The new balance is written to non-volatile programmable storage media 1014, block 6006, and process 6000 ends.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A prepaid payment mobile phone comprising:
a processor;
a non-volatile programmable memory coupled to the processor and configured to store a current balance associated with a primary account number;
an input device coupled to the processor and configured to receive a request for the current balance of the prepaid payment mobile phone;
a display coupled to the processor and configured to show the current balance;
a radio frequency (RF) transceiver coupled to the processor and configured to transmit transaction data associated with a transaction comprising the primary account number to a point of sale device, wherein the primary account number is stored on the non-volatile programmable memory; and
a cellular transceiver coupled to the processor and configured to receive information regarding the current balance after the transaction, wherein the information regarding the current balance is received via a Short Message Service (SMS) message and the current balance is encoded onto the non-volatile programmable memory using the processor.

2. The prepaid payment mobile phone of claim 1, wherein the SMS message is received from an issuer or a payment processor.

3. The prepaid payment mobile phone of claim 2,
wherein the SMS message comprises a transaction amount representing an amount of a last transaction completed using the prepaid payment mobile phone;
wherein the last transaction amount is subtracted from a previous balance using the processor; and
wherein the result of the subtraction comprises the current balance.

4. The prepaid payment mobile phone of claim 1, wherein the transaction is a reload transaction initiated at the point of sale device and the prepaid payment mobile phone is loaded with additional funds.

5. The prepaid payment mobile phone of claim 1, wherein the display is further configured to prompt for input of a personal identification number (PIN).

6. The prepaid payment mobile phone of claim 5, wherein the processor is configured to determine whether the PIN is valid and display the current balance if the PIN is determined to be valid.

7. The prepaid payment mobile phone of claim 6, wherein the PIN is stored in the non-volatile programmable memory on the prepaid payment mobile phone.

8. The prepaid payment mobile phone of claim 1, wherein the current balance is a debit balance of the prepaid payment mobile phone, indicating an amount of currency remaining on the prepaid payment mobile phone.

9. The prepaid payment mobile phone of claim 1, wherein the SMS message is sent in response to initiating a transaction at the point of sale device.

10. The prepaid payment mobile phone of claim 9, wherein the SMS message is received from an issuer or a payment processor.

11. A method of encoding a current balance on a prepaid payment mobile phone comprising:
   storing a primary account number on a non-volatile programmable memory;
   transmitting, with a radio frequency (RF) transceiver, transaction data associated with a transaction to a point of sale device, the transaction data comprising the primary account number;
   receiving, with a cellular transceiver, information regarding a current balance of an account associated with the primary account number, wherein the receiving of information regarding the current balance comprises receiving a Short Message Service (SMS) message;
   encoding, with a processor, the current balance in the non-volatile programmable memory on the prepaid payment mobile phone.

12. The method of claim 11, wherein the receiving of information regarding the current balance comprises receiving the SMS message comprising the current balance as calculated by an issuer, an acquirer, a merchant, or a payment network.

13. The method of claim 11, wherein the SMS message is saved to the prepaid payment mobile phone as a SMS notification or as data for a payment program.

14. The method of claim 11, wherein the SMS message comprises a transaction amount and the current balance is determined, using the processor, by subtracting the transaction amount from a previous balance.

15. The method of claim 11, wherein the SMS message is received from an issuer or a payment processor.

16. The method of claim 11, wherein the SMS message is sent in response to initiating a payment transaction or a reload transaction request at the point of sale device.

17. The method of claim 11, further comprising displaying a current balance of the prepaid payment mobile phone, wherein in response to receipt of a balance request from an input device on the prepaid payment mobile phone, the current balance is retrieved from the non-volatile memory within the prepaid payment mobile phone and the current balance is displayed on a screen.

18. The method of claim 11, further comprising prompting for input of a personal identification number (PIN), determining whether the PIN is valid, and displaying the current balance of the prepaid payment mobile phone if the PIN is determined to be valid.

19. The method of claim 11 wherein, when a customer uses the prepaid payment mobile phone in a transaction at a merchant, the merchant sends a message to a payment processing network to determine whether there are sufficient funds on the prepaid payment mobile phone to pay for the transaction or a portion of the transaction.

20. The method of claim 11 wherein, the balance is calculated after the SMS is received from the issuer, the acquirer, the merchant, or the payment network, using the information regarding the current balance.

21. The method of claim 11, wherein the payment processing network analyzes whether there are sufficient funds on the prepaid payment mobile phone to pay for the transaction or a portion of the transaction after determining whether the primary account number is valid by using a hot list storage database containing valid and invalid primary account numbers.

* * * * *